Nov. 1, 1955

J. A. ZUBLIN 2,722,494

PROCESS FOR PRODUCING FLEXIBLE DRILL PIPE
HAVING WEAR RESISTANT MATING SURFACES

Filed Nov. 10, 1954

INVENTOR.
John A. Zublin
BY
Burns, Doane & Benedict
ATTORNEYS

United States Patent Office 2,722,494
Patented Nov. 1, 1955

2,722,494

PROCESS FOR PRODUCING FLEXIBLE DRILL PIPE HAVING WEAR RESISTANT MATING SURFACES

John A. Zublin, Los Angeles, Calif.

Application November 10, 1954, Serial No. 467,915

3 Claims. (Cl. 148—19)

In United States Letters Patent No. 2,515,366, issued to me on July 18, 1950, I describe and claim a heavy duty flexible drill pipe which is capable of following a curved bore and of withstanding the high stresses encountered in driving a drilling bit and in imparting to the bit the necessary weight for effective drilling. Such flexible drill pipes may be used in combination with a normally curved resilient drill guide as illustrated in my copending application Serial No. 189,591, filed October 11, 1950, now Patent No. 2,585,207, issued February 12, 1952, and entitled "Apparatus for Drilling Lateral Bores Deviating from Vertical Well Bores."

The flexible drill pipe described in my Patent No. 2,515,366 consists essentially of a tubular pipe having a plurality of longitudinally spaced generally circumferential slots cut entirely through its walls. While the slots are generally circumferential, they deviate from a true circumference in a manner to define the edges of a plurality of complementary teeth of dovetail configuration on each side of the slot, the teeth on one side of the slot intermeshing and loosely interlocking the teeth on the opposite side of the slot to provide a loose joint. The flexible pipe thus consists of a plurality of rigid sections of pipe which are capable of limited relative movement but which are prevented from being separated from each other by the intermeshing and interlocking teeth.

The walls which define the circumferentially extending slot in the pipe form mating surfaces which may and do come into contact during normal use of the flexible pipe. Tremendous forces are transmitted between these mating surfaces during the driving of the drill bit and the application of adequate drilling weight to the bit. Such forces are particularly high in those portions of the flexible drill pipe which are positioned in a curved bore or in a curved drill guide. The loading forces applied to the mating surfaces of the intermeshing teeth are not constant but are alternately relieved and reapplied. This makes it essential that the metal of the teeth possess toughness, which is dependent upon strength and ductility, or upon strength and flexibility to enable the teeth to withstand the heavy shocks. On the other hand, the mating surfaces of the teeth must be extremely hard to prevent excessive wear or peening of the teeth. I have thus found that uniform hardness of all of the metal forming the teeth is impractical. A tooth of uniform hardness having adequate toughness does not possess sufficient surface hardness, whereas a uniform tooth having adequate surface hardness lacks the requisite toughness to withstand long usage. I have therefore found it essential that the flexible drill pipe be subjected to a surface hardening treatment to obtain the requisite hardness on the mating surfaces of the teeth while retaining the requisite toughness in the interior or core of the teeth.

In the production of my flexible drill pipe I prefer to use a tube of low carbon-nickel-carburizing steel. The generally circumferential slots which form the teeth and divide the tube into sections are conveniently cut with a torch. This torch cutting of the metal tube leaves an oxidized layer on the opposite surfaces of the slot which makes it particularly difficult to secure uniform hardening of such surfaces. If the sections of the flexible drill pipe could be retained in positions such that the slots possess their original uniform width, no particular problem would exist in the surface hardening treatment of the mating surfaces of the teeth. However, the sections of the flexible drill pipe inevitably move relative to each other during normal handling of the pipe, and the width of a slot between two sections may vary from zero to approximately twice the normal slot width. A satisfactory surface hardening treatment of the mating surfaces of the teeth requires uniform exposure of the mating surfaces to the surface hardening medium. This uniform exposure of the mating surfaces is especially necessary by reason of the oxidized layer existing on such mating surfaces following the torch cutting step in the production of the flexible drill pipe. It is, therefore, imperative that the circumferential slots between sections of the flexible drill pipe be of uniform width during exposure to the surface hardening medium to permit unimpaired and uniform circulation of the gas or liquid hardening medium around and adjacent all of the mating surfaces which are to be hardened.

It is thus one of the primary objects of the present invention to provide a method of producing surface hardened flexible drill pipe of the type under consideration wherein uniform surface hardening of the mating surfaces of the intermeshing and interlocking teeth is secured. Another object of the instant invention is to provide a procedure for preventing contact between the mating surfaces of the intermeshing teeth of a flexible drill pipe during heat treatment of the pipe in the production of a surface hardened flexible drill pipe.

A more detailed understanding of the invention may be obtained from the following description which has reference to the accompanying drawings, wherein.

Figure 1:
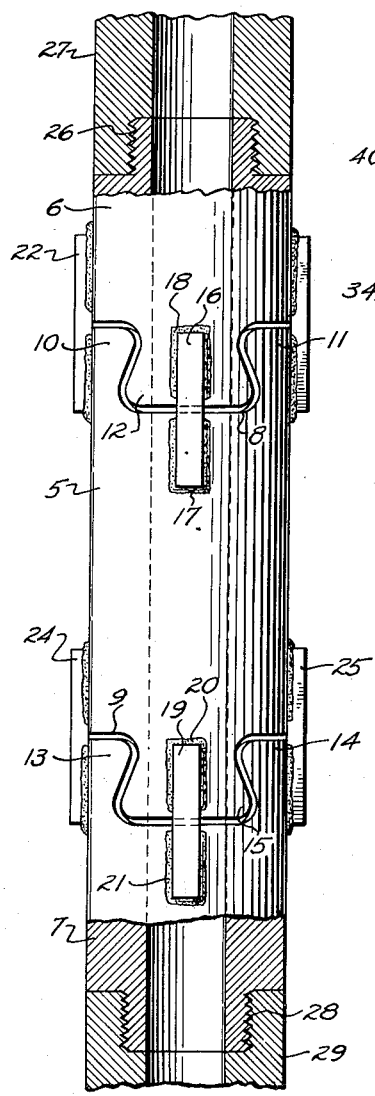
Figure 1 is a view partly in side elevation and partly in section of a portion of a length of flexible drill pipe having secured thereto elements which are utilized in the process of surface hardening according to the invention.

I have illustrated in Figure 1 a section 5 of tubular metal pipe and two half sections 6 and 7. The section 5 and the half sections 6 and 7 have been formed from a single integral length of pipe by cutting the generally circumferential slots 8 and 9 through the walls of the pipe. While these slots are generally circumferential, they deviate from true circumferential paths to form or define interengaging and intermeshing dovetail teeth. Several such teeth are shown in the drawing and they are designated by the reference numerals 10, 11, 12, 13, 14 and 15, respectively. These intermeshing and interlocking teeth have the characteristics and perform the functions of the similar teeth illustrated and described in my Patent No. 2,515,366, mentioned above.

The slots 8 and 9 are produced by the removal of metal from the wall of a length of pipe. Such slots are produced by a flame or torch cutting. Therefore the slots may be considered as having a fixed and uniform normal width. However, since the section 5 and the half sections 6 and 7 are free to partake of limited relative movement, it will be apparent that the width of the slots 8 and 9 will not remain uniform during handling of the flexible drill pipe. Since it is essential that the width of the slots 8 and 9 remain constant and uniform during the surface hardening treatment in order to obtain uniform surface hardening of those surfaces, I provide rigid members which can be rigidly secured to the pipe sections in positions to span the slots 8 and 9.

The section 5 and the half section 6 are first appropriately position so that the slot 8 is of uniform width throughout its length. A rigid member such as a rigid metal bar 16 may then be positioned to span the slot 8, and this member may be rigidly secured to the section 5 and the half section 6 by welding as indicated at 17. A similar rigid member or bar 19 is rigidly secured to the pipe section 5 and the half section 7 in position to span the slot 9. The bar 19 is secured in position after the width of the slot 9 has been made uniform throughout its length. Securing welds are indicated at 20 and 21. There is preferably no welding material immediately adjacent the slots 8 and 9 as such welding material might interfere with free circulation of the surface hardening medium. Additional rigid members 22, 23, 24 and 25 may be secured to the sections in a similar manner if this is found to be necessary. The welds 17, 18, 20 and 21 are preferably made of brittle welding material so that the rigid members can be easily separated from the pipe section by a hammer blow after those rigid members have served their purpose.

After section 5 and the half sections 6 and 7 have been made into a rigid assembly in the manner illustrated in Figure 1, the assembly may be placed in a suitable furnace for surface hardening treatment. I prefer to maintain the assembled unit in the furnace for a period of about 8 hours at a temperature of about 1700° F. in an atmosphere of carbon-containing gas such as carbon monoxide. The assembled unit is then withdrawn from the furnace and is allowed to cool slowly. The upper end of the half section 6 is then machined to remove the outer casing of carburized steel and to cut the threads 26 to enable the unit to be subsequently secured to another half section 27. The section 7 is then similarly machined to form the threads 28 which can be subsequently joined to another half section 29. After the assembly has been machined to form the threads 26 and 29, the assembly is reheated to a temperature above the upper critical point for the metal of the core beneath the case hardened surface. This temperature may be approximately 1650°. The assembled unit is then quenched in water or oil. The surfaces which have been carburized then become extremely hard while the core metal remains tough. The portions of the half sections 6 and 7 which have been machined to remove the carburized surface are also tough.

Figure 2:
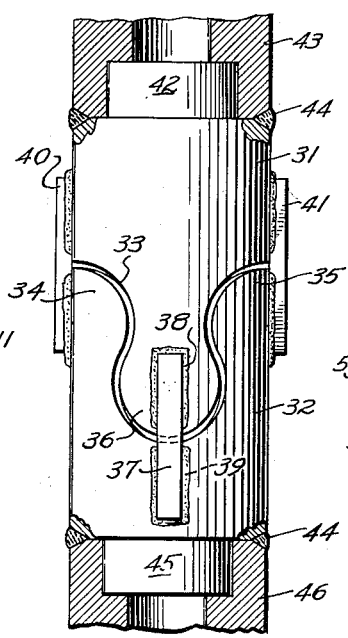
Figure 2 is a view similar to Figure 1, but illustrating a portion of a length of drill pipe having interengaging and interlocking teeth of a slightly different configuration.

Figure 2 illustrates an assembly embodying a slot having a somewhat different configuration from those shown in Figure 1. The half section 31 and the half section 32 have been formed from a single integral length of pipe by flame cutting the slot 33. The intermeshing and interlocking teeth 34, 35 and 36 are thus formed. The extremities of these teeth are arcuate, rather than being flat as shown in Figure 1. A rigid metal bar 37 is secured to the half sections 31 and 32 by means of welds 38 and 39. This rigid member 37 spans the slot 33. Additional rigid members 40 and 41 may be secured to the assembly if desired.

The rigidly assembled half sections 31 and 32 may then be given the same surface hardening treatment described above. The half section 31 is machined to provide the reduced portion 42 which may be secured to another half section 43 by means of welding indicated at 44. The opposite end of the assembled unit may be machined to form the reduced portion 45 by means of which the half section 32 may be secured to a similar half section 46 by means of a weld 44.

Figure 3:
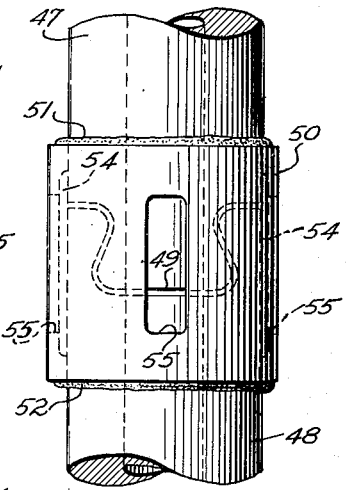
Figure 3 is a side elevational view of a portion of a length of flexible drill pipe showing a modified form of element secured thereto for conditioning the drill pipe for the surface hardening treatment.
Figure 4:
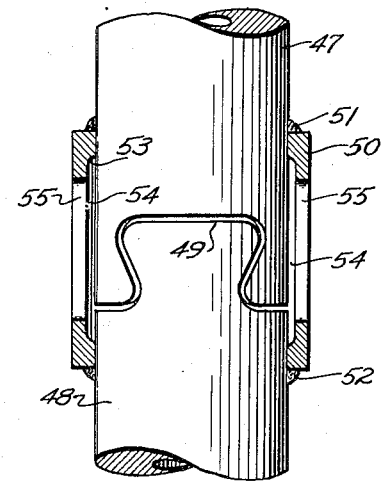
Figure 4 is a longitudinal sectional view of the portion of the drill pipe shown in Figure 3.

Figures 3 and 4 illustrate a section 47 separated from a similar section 48 by means of a slot 49. A tubular sleeve 50 has been positioned to surround the slot 49. The sections 47 and 48 have been positioned relative to each other in such manner that the width of the slot 49 is uniform throughout its length. The sleeve has been secured to the section 47 by means of a weld 51 and to the section 48 by means of a weld 52. The sections 47 and 48 are thus held rigidly in their appropriate positions during handling. The sleeve 50 is enlarged internally as indicated at 53 to provide an annular space 54. The sleeve 50 is also provided with a plurality of window apertures 55 through which the surface hardening medium may enter. This medium may then circulate around the annular space 54 and through the slot 49 for uniform surface hardening of the mating surfaces which define the slot. The sections 47 and 48 may be secured to other sections in any suitable manner.

The sleeve 50 may be formed of relatively brittle or friable metal which will permit it to be readily fractured for separation from the flexible drill pipe after it has served its purpose. Alternately, the welds 51 and 52 may be of brittle material which will permit their being easily fractured to enable the sleeve 50 to slide longitudinally from the flexible drill pipe without fracturing of the sleeve.

As pointed out hereinabove, a flexible drill pipe to be satisfactory must be capable of withstanding the particularly high load forces applied to the mating surfaces of its intermeshing teeth while also possessing the characteristic that its intermeshing teeth surfaces are extremely hard to prevent excessive wear or peening of the teeth. This calls for the teeth to have the requisite internal toughness to withstand the loads encountered in use, with the surfaces thereof having adequate surface hardness to prevent excessive wear in use.

In the production of flexible drill pipe in accordance with the instant invention, a length of steel tubing is divided into separate interlocking sections by a torch cut being formed generally circumferentially of the tubing at positions longitudinally spaced relative to such tubing. The torch cut slots extend around the periphery to produce interlocking and intermeshing teeth. These interengaging teeth on the adjoining ends of adjacent sections impart flexibility to the pipe while preventing disengagement of adjacent pipe sections.

In forming the generally circumferential slots by torch cutting the mating surfaces of the slots are oxidized. In order that these mating surfaces may in the final product have the requisite uniform surface hardness it is of utmost importance that the carburizing gases contact such mating surfaces uniformly and for a longer period of time than would be required on ordinary non-oxidized surfaces. Thus, in order that the surfaces will possess the required carbon content for final surface hardness the oxygen in the oxidized layer must be displaced by the carbon in the carburizing gas as it flows across the surfaces.

Due to the location of the mating surfaces it is impractical to remove the oxidized coating by mechanical means. In the light of this problem it is particularly important in the production of flexible drill pipe that the surfaces of the torch cut slots be retained uniformly spaced from one another for proper exposure of such surfaces to the carburizing gases in the surface hardening operation. This uniform spacing of the mating surfaces calls for the adjacent pipe sections to be retained in their relative positions as that had prior to the production of the torch cut slot between the adjoining ends of such sections.

I have illustrated and described what I now consider to be the preferred forms of my invention. It is to be understood, however, that the illustrated forms are exemplary only and that various modifications may be resorted to without departing from the broader scope of my invention, as defined by the following claims. The instant application is a continuation-in-part of my copending application Serial No. 260,449 filed December 7, 1951, now abandoned.

Having thus described my invention, I claim:

1. A method for producing flexible drill pipe composed of heavy inseparable, tubular sections in end-to-end relation, which method comprises torch cutting generally circumferential slots at longitudinally spaced positions along a length of pipe to form loosely intermeshing and interlocking teeth with narrow torch cut clearance between mating surfaces of the teeth, positioning the tubular sections relative to each other in substantially the same relationship as that prior to torch cutting to provide substantially uniform clearance between the mating surfaces of the teeth, rigidly securing a rigid member to the sections to prevent relative movement thereof, submitting the assembly including the opposed surfaces of said intermeshing teeth to a surface hardening treatment, and subsequently separating the rigid member from the sections to free said sections for relative movement.

2. A method for producing flexible drill pipe having hardened wear resistant surfaces comprising the steps of cutting generally circumferential slots at longitudinally spaced positions along a length of pipe to form the pipe into rigid pipe sections interconnected in end-to-end relationship by a plurality of teeth having complementary recesses on the adjoining ends of adjacent pipe sections with the teeth on an end of one section positioned in the recesses of and loosely interlocking with the teeth on the adjoining end of the adjacent section to provide a loose joint between these sections to prevent axial separation of the sections while permitting limited universal movement between the sections, positioning said sections with respect to one another with a substantially uniform clearance space between the mating surfaces of the teeth and complementary recesses on adjoining ends of adjacent pipe sections, rigidly securing a rigid member to each of said sections to span the clearance space between the adjoining ends of the adjacent sections and retain the mating surfaces substantially uniformly spaced from one another to freely expose the area of said mating surfaces for heat treatment, subjecting the flexible pipe surfaces including the mating surfaces of said teeth and complementary recesses to a carburizing treatment to carburize all of the surfaces of the flexible pipe, subjecting the flexible pipe to a heating and quenching treatment to effect surface hardening, and subsequently separating said rigid member from said sections to free said sections for relative movement.

3. A method for producing flexible drill pipe having hardened, wear resistant surfaces comprising the steps of torch cutting generally circumferential slots at longitudinally spaced positions along a length of pipe to form the pipe into rigid pipe sections interconnected in end-to-end relationship by a plurality of teeth having complementary recesses on the adjoining ends of adjacent pipe sections with the teeth on an end of one section positioned in the recesses of and loosely interlocking with the teeth on the adjoining end of the adjacent section to provide a loose joint between these sections to prevent axial separation of the sections while permitting limited universal movement between the sections, positioning said sections with respect to one another with a substantially uniform clearance space between the mating surfaces of the teeth and complementary recesses on adjoining ends of adjacent pipe sections, rigidly securing a rigid member to each of said sections to span the clearance space between the adjoining ends of the adjacent sections and retain the mating surfaces substantially uniformly spaced from one another to freely expose the area of said mating surfaces for heat treatment, subjecting the flexible pipe surfaces including the mating surfaces of said teeth and complementary recesses to a surface hardening treatment, and subsequently separating said rigid member from said sections to free said sections for relative movement.

No references cited.